United States Patent
Kim et al.

(10) Patent No.: US 11,870,103 B2
(45) Date of Patent: Jan. 9, 2024

(54) ELECTRODE ASSEMBLY HAVING NEGATIVE ELECTRODE DISPOSED AS OUTERMOST ELECTRODE, AND LITHIUM-ION SECONDARY BATTERY HAVING SAME

(71) Applicant: LiBEST INC., Daejeon (KR)

(72) Inventors: Joo Seong Kim, Daejeon (KR); Jin Hong Ha, Daejeon (KR); Gil Ju Lee, Daejeon (KR)

(73) Assignee: LiBEST INC., Daejeon (KR)

( * ) Notice: Subject to any disclaimer, the term of this patent is extended or adjusted under 35 U.S.C. 154(b) by 3 days.

(21) Appl. No.: 16/878,941

(22) Filed: May 20, 2020

(65) Prior Publication Data
US 2020/0280042 A1    Sep. 3, 2020

Related U.S. Application Data

(63) Continuation of application No. PCT/KR2018/014386, filed on Nov. 21, 2018.

(30) Foreign Application Priority Data

Nov. 21, 2017  (KR) .................. 10-2017-0155464
Nov. 21, 2018  (KR) .................. 10-2018-0144796

(51) Int. Cl.
*H01M 50/54*    (2021.01)
*H01M 50/536*   (2021.01)
*H01M 50/534*   (2021.01)

(52) U.S. Cl.
CPC .......... *H01M 50/54* (2021.01); *H01M 50/534* (2021.01); *H01M 50/536* (2021.01)

(58) Field of Classification Search
CPC .................. H01M 50/512; H01M 50/509
See application file for complete search history.

(56) References Cited

U.S. PATENT DOCUMENTS

2016/0118640 A1 *  4/2016  Miyake ............... H01M 50/553
                                                    429/163
2017/0084963 A1 *  3/2017  Park .................... H01M 10/425
(Continued)

FOREIGN PATENT DOCUMENTS

CN    101504991 A    8/2009
EP    3142171 A1    3/2017
(Continued)

OTHER PUBLICATIONS

Machine Translation of Tatsuki (Year: 2000).*
(Continued)

*Primary Examiner* — Matthew T Martin
*Assistant Examiner* — Ankith R Sripathi
(74) *Attorney, Agent, or Firm* — HAMRE, SCHUMANN, MUELLER & LARSON, P.C.

(57) ABSTRACT

An electrode assembly according to the present disclosure includes one or more unit cells each equipped with a pair of electrodes having different polarities with a separator interposed therebetween, an electrode mixture coated on one or both surfaces of the pair of electrodes, and electrode tabs located on the edges of the respective electrodes and not coated with the electrode mixture, and the electrode tabs include an electrode parallel connection tab and an electrode lead connection tab, and any one or more of the electrode parallel connection tab and the electrode lead connection tab are formed on the electrodes, and an outermost electrode is a negative electrode.

12 Claims, 21 Drawing Sheets

(56) References Cited

U.S. PATENT DOCUMENTS

| | | |
|---|---|---|
| 2017/0214026 A1 | 7/2017 | Ueda et al. |
| 2018/0026254 A1 * | 1/2018 | Oh .................. H01M 50/55 |
| | | 429/153 |
| 2018/0277816 A1 * | 9/2018 | Minagata ............ H01M 50/463 |
| 2021/0210761 A1 * | 7/2021 | Mimura .............. H01M 50/586 |

FOREIGN PATENT DOCUMENTS

| | | | | |
|---|---|---|---|---|
| EP | 3703175 A1 * | 9/2020 | ........ | H01M 10/0525 |
| JP | 2000173559 * | 6/2000 | ............. | H01M 2/02 |
| JP | 2001-006741 | 1/2001 | | |
| JP | 2009-188037 | 8/2009 | | |
| JP | WO-2017163846 A1 * | 2/2019 | ........ | H01M 10/0525 |
| JP | 2000173559 * | 6/2020 | ............. | H01M 2/02 |
| JP | 2019053892 A * | 10/2021 | ............ | H01M 10/04 |
| KR | 1020080009350 A | 1/2008 | | |
| KR | 1020130063709 A | 6/2013 | | |
| KR | 101365718 B1 | 2/2014 | | |
| KR | 1020150033854 A | 4/2015 | | |
| KR | 101650024 B1 | 8/2016 | | |
| KR | 101684325 B1 | 12/2016 | | |
| KR | 101783703 B1 | 10/2017 | | |
| KR | 101789066 B1 | 10/2017 | | |
| WO | 2016051645 A1 | 4/2016 | | |
| WO | 2016175148 A1 | 11/2016 | | |
| WO | WO-2017163846 A1 * | 9/2017 | ........ | H01M 10/0525 |

OTHER PUBLICATIONS

The extended Search Report issued in European Application No. 18880693.9, dated Jun. 7, 2021.
International Search Report of PCT/KR2018/014386 dated Feb. 28, 2019, in English.

* cited by examiner

FORM PATTERN
(UPPER STAMPED PORTION +LOWER STAMPED PORTION)
IN PARALLEL WITH WIDTH OF CASING

WAVE PATTERN

Electrode 1'    Electrode 2'

ELECTRODE ASSEMBLY HAVING NEGATIVE ELECTRODE DISPOSED AS OUTERMOST ELECTRODE, AND LITHIUM-ION SECONDARY BATTERY HAVING SAME

TECHNICAL FIELD

The present disclosure relates to a lithium ion secondary battery having enhanced safety and bending properties.

BACKGROUND

A secondary battery refers to a battery that may be charged and discharged and re-charged, as opposed to a primary battery which cannot be re-charged, and has been widely used in the field of advanced electronic devices such as cellular phones, notebook computers, camcorders, and other portable electronic devices. As portable electronic devices are designed and manufactured to be lighter in weight with improved performance, and further taking into consideration advancements in the Internet of Things (IoT), secondary batteries as power supplies therefor are the subject of advanced research and development.

Among secondary batteries, lithium secondary batteries have a higher voltage than nickel-cadmium batteries or a nickel-hydrogen batteries mainly used as power supplies for portable electronic devices and also has a high energy density per unit weight. Therefore, demand for lithium secondary batteries is on the increase.

Secondary batteries utilize an electrochemical reaction occurring between an electrolyte and a positive electrode and the electrolyte and a negative electrode when the positive electrode and the negative electrode are connected to each other while they are inserted into the electrolyte. Unlike conventional primary batteries, the secondary battery is a chargeable and dischargeable battery that can be recharged with energy by a charger and used again when energy is consumed by an electronic device.

Typically, lithium secondary batteries include any one of a jelly-roll type electrode assembly in which a separator is inserted between a positive electrode and a negative electrode, which are then spirally wound together, or a stacked type electrode assembly in which multiple positive electrodes and negative electrodes are stacked with a separator interposed therebetween. For example, a cylindrical battery is manufactured by housing the jelly-roll type electrode assembly in a cylindrical can, injecting an electrolyte therein, and sealing the can. A prismatic battery is manufactured by pressing the jelly-roll type electrode assembly or the stacked type electrode assembly to be flat, and then housing the flat electrode assembly in a prismatic can. Further, a pouch type battery is manufactured by packing the jelly-roll type electrode assembly or the stacked type electrode assembly together with an electrolyte in a pouch type case. In such electrode assemblies, a positive electrode tab and a negative electrode tab are withdrawn from a positive electrode and a negative electrode, respectively, to the outside of the electrode assembly and then connected with a positive electrode and a negative electrode of a secondary battery.

Meanwhile, an electrode tab on multiple positive electrodes and negative electrodes stacked in a vertical direction is connected to an electrode lead. A conventional joint structure between an electrode tab and an electrode lead slightly decreases in coherence during direct welding. Thus, when a battery is bent or distorted during use, a problem occurs in the joint between the electrode tab and the electrode lead.

When a conventional lithium secondary battery including an electrode assembly and a case covering the electrode assembly is bent while in use or as part of a test, a short circuit is caused by damage to the covering and deviation and misalignment of components in the electrode assembly including a positive electrode, a negative electrode, an electrode lead, and a separator. In many cases, a terminal portion of the conventional lithium secondary battery is easily cut by an external impact or force so that the capacity is sharply reduced and the battery cannot perform its original function.

According to conventional technologies, when a typical battery assembly is bent, compressive stress is applied to an inner bent portion and tensile stress is applied to the opposite side. Therefore, a case covering an electrode assembly of the battery is also expanded or contracted, and, thus, mechanical damage occurs locally.

Problems to be Solved

Accordingly, the present disclosure provides an electrode assembly in which multiple electrodes are stacked in a vertical direction, and a negative electrode is placed as an outermost electrode so as to suppress the breakage of an electrode and an electrode terminal when a flexible battery is bent. As a result, the embodiments described and recited herein improve workability and minimize the loss of energy density of a battery, and thus enhance the bending durability and the safety of at least the battery.

Means for Solving the Problems

To solve the above-described problem, at least one embodiment of an electrode assembly described or recited herein includes: one or more unit cells, each including a pair of electrodes having different polarities with a separator interposed therebetween; an electrode mixture coated on one or both surfaces of the pair of electrodes; and electrode tab located on the edge of each electrode and not coated with the electrode mixture. The electrode tab includes an electrode parallel connection tab and an electrode lead connection tab, and one or both of the electrode parallel connection tab and the electrode lead connection tab are formed on the electrodes; and a negative electrode is placed and stacked as an outermost electrode of the electrode assembly. The outermost electrode is equipped with both the electrode parallel connection tab and the electrode lead connection tab.

For the pair of electrodes that have different polarities and that include only the electrode parallel connection tab, the size of a negative electrode mixture coated on an negative electrode of the pair of electrodes is greater than the size of a positive electrode mixture coated on a positive electrode. Thus a corner of the negative electrode mixture is set to deviate to the outside by less than 5 mm with respect to a corner of the positive electrode mixture, and a negative electrode capacity per unit area is 1 to 1.2 times greater than a positive electrode capacity per unit area.

For an negative electrode that includes only an electrode parallel connection tab and a positive electrode that includes both an electrode parallel connection tab and an electrode lead connection tab facing each other with a separator interposed therebetween, the size of an negative electrode mixture coated on the negative electrode that includes only an electrode parallel connection tab is greater than the size of the positive electrode that includes both an electrode parallel connection tab and an electrode lead connection tab. Thus, a corner of the negative electrode that includes only an electrode parallel connection tab is set to deviate to the outside with respect to a corner of the positive electrode mixture, and the negative electrode that includes only an electrode parallel connection tab covers a tab-lead joint portion formed on the positive electrode.

One surface of an outermost negative electrode placed on each of the uppermost stage and the lowermost stage electrode of the electrode assembly is coated with the electrode mixture.

The electrode assembly further includes a reinforcing tab welded and fixed on any one electrode lead connection tab among electrode tabs included in the electrode assembly.

An electrode lead joined on any electrode lead connection tab among electrode tabs that are included in the electrode assembly further includes a bending structure that is bent 180° in an opposite direction toward the outside of the electrode assembly when it has been welded toward the electrode assembly.

A tab-lead joint portion having the electrode lead connection tab and an electrode lead overlapped using the reinforcing tab is inserted and aligned in the separator.

A tab-lead joint portion where the electrode lead connection tab and the electrode lead having the bending structure are joined to each other is inserted and aligned in the separator.

To solve the above-described problem, a lithium ion secondary battery according to another aspect of the present disclosure includes: an electrode assembly; and a case that may cover the electrode assembly, and the case may be have upper stamped portions and lower stamped portions that are repeatedly stamped to cover the outside of the electrode assembly.

The multiple upper stamped portions and lower stamped portions are successively formed in parallel with the width of the electrode assembly and the case.

Effects

According to the present disclosure, in an electrode assembly including multiple electrodes stacked in a vertical direction with a separator, at least one electrode includes an electrode parallel connection tab and an electrode lead connection tab, and a negative electrode is placed as an outermost electrode to improve the structure. Therefore, it is possible to suppress the breakage of an electrode and an electrode terminal, which may occur due to bending and distortion, resulting from at least one external force, in a flexible environment. Also, it is possible to improve the workability and minimize the loss of energy density by placing a negative electrode as an outermost electrode on each of the uppermost stage and the lowermost stage, and thus enhance the bending durability and the safety of at least the battery.

BEST MODE

Figure 1:
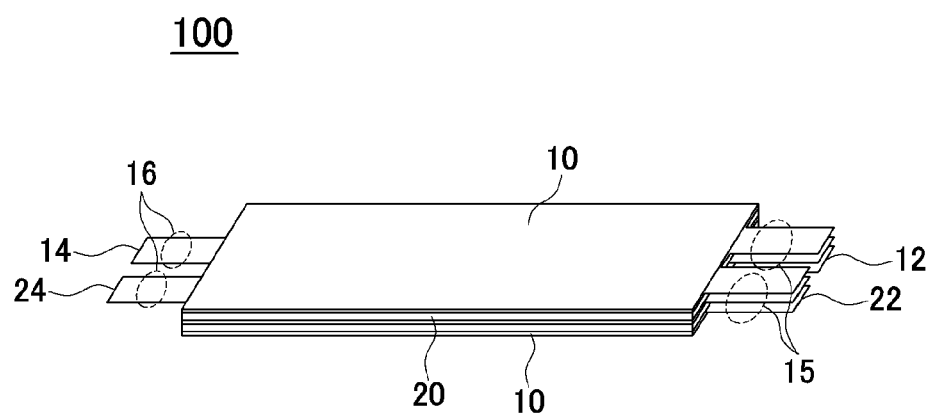
FIG. 1 is an illustration of an exemplary configuration of an electrode assembly included in a flexible battery, according to at least one embodiment of the present disclosure.

Hereafter, a flexible battery according to the present disclosure will be described with reference to the accompanying drawings.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 2:
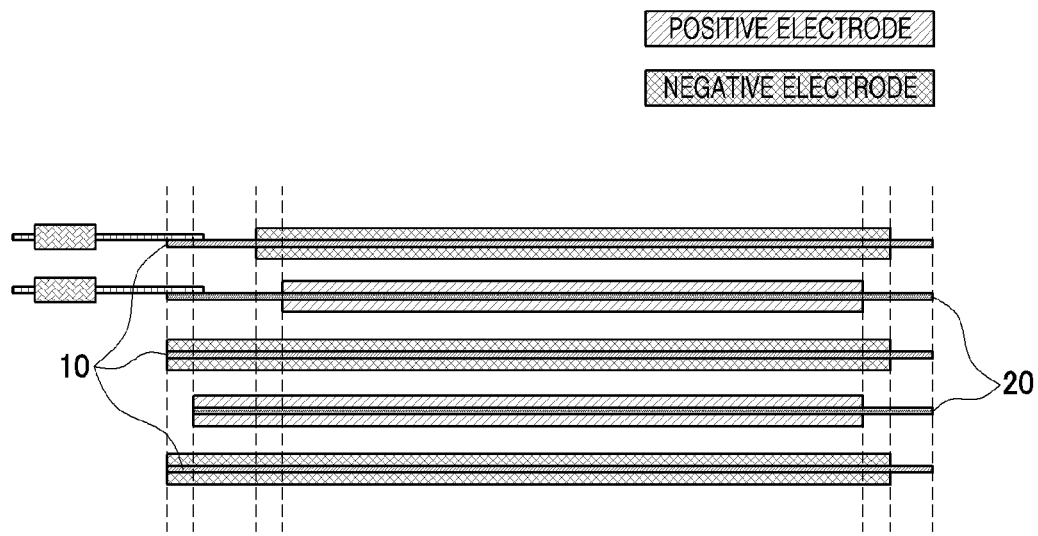
FIG. 2 is an exploded view of the electrode assembly in which a negative electrode is placed as an outermost electrode, according to at least one embodiment of the present disclosure.

An electrode assembly, which may be included in a flexible battery, in which a negative electrode is placed as an outermost electrode, according to at least one embodiment of the present disclosure, is described with reference to FIG. 1 and FIG. 2.

An electrode assembly 100, in accordance with at least one embodiment described and recited herein, includes a negative electrode 10, a positive electrode 20, an electrolyte serving as an ion transport medium between the negative electrode and the positive electrode, and electrode tabs located on the edges of the electrodes to provide one or both of an electrode parallel connection and electrode lead connection, depending on the application. Any one or more of the electrodes that include the negative electrode 10 and the positive electrode 20 has on both sides with an electrode parallel connection tab and an electrode lead connection tab spaced apart from each other. For example, a certain negative electrode 10 placed on the uppermost or lowermost stage of the electrode assembly 100 has an negative electrode parallel connection tab 12 and an negative electrode lead connection tab 14, and a certain positive electrode 20 facing the negative electrode 10 with a separator interposed therebetween has with a positive electrode parallel connection tab 22 and a positive electrode lead connection tab 24.

In the electrodes, one or both surfaces of an electrode current collector are coated with an electrode mixture, and the electrode parallel connection tabs and the electrode lead connection tabs are exposed without being coated with the electrode mixture.

The electrodes having the same polarity are connected to each other by the electrode parallel connection tab. That is, multiple negative electrodes 10 and multiple positive electrodes 20 are electrically connected by Tab-tab joint portions connecting each tab.

Meanwhile, an electrical connection between the electrode lead connection tab of the electrode assembly and the electrode lead provides a path through which electrons move from the electrode assembly to the outside of the case. The separator may be located between the electrodes having different polarities to block the flow of electrons but allows ions in the electrolyte to pass through.

Electrode parallel connection tabs 12 and 22, located on edges of the negative electrode 10 and the positive electrode 20 electrically connects electrodes having the same polarity in parallel with each other. Tab-tab joint portions 15 connected in parallel with each other are located on the separator covering an outer surface of the outermost electrode placed on the uppermost stage or the lowermost stage of the electrode assembly, and then the joint portions are finished and taped.

In the present disclosure, a tab-tab joint portion 15 where the electrode parallel connection tabs 12 and 22 on the electrodes are connected to each other and a tab-lead joint portion 16 where the electrode lead connection tabs 14 and 24 and the electrode lead are connected to each other may be electrically connected with each other by joint methods including spot electric welding, ultrasonic welding, laser welding, and joining with conductive adhesive.

Figure 3:
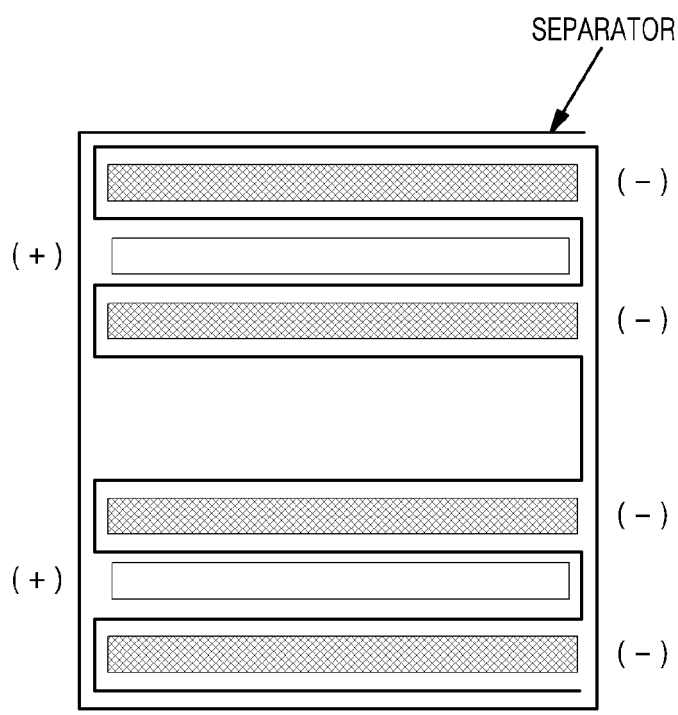
FIG. 3 illustrates an example of placement of multiple electrodes of the electrode assembly and a separator between the multiple electrodes, according to at least one embodiment of the present disclosure.

FIG. 3 shows at least one example embodiment of an electrode assembly in which the negative electrodes 10 and the positive electrodes 20 are successively stacked with a separator 30 interposed therebetween. Separator 30 may be formed into a zigzag stack to cover an entire outside of the electrode assembly. If negative electrodes and positive electrodes are stacked conventionally, the electrodes and separator within the electrode assembly may deviate and be misaligned when subjected to external bending and distortion, causing the precipitation of lithium and an internal short circuit, thus creating a safety hazard. However, the present disclosure provides improvements in design and safety by providing the zigzag stack and the tab-tab joint portion where the electrode parallel connection tabs are electrically connected to each other, thus holding the electrodes within the electrode assembly. Therefore, it is possible to minimize the deviation and misalignment even in a flexible environment, e.g., a flexible device case.

Figure 4:
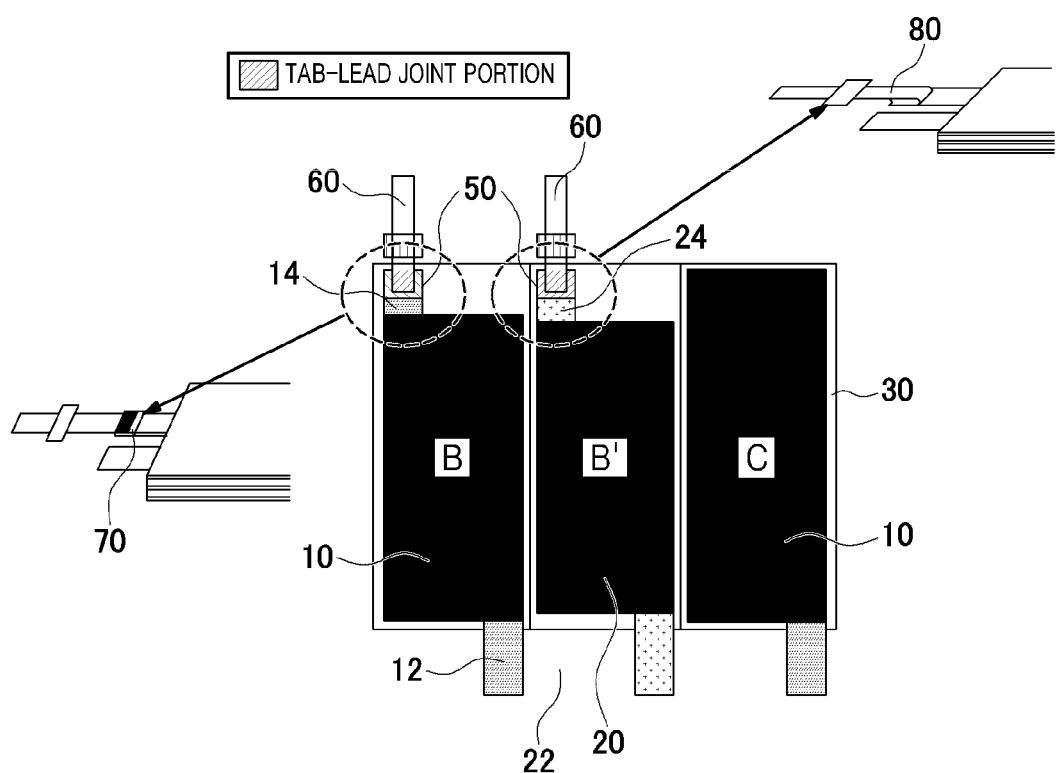
FIG. 4 illustrates an electrode assembly, in an unfolded state, according to at least one embodiment of the present disclosure.

FIG. 4 shows an unfolded state of the electrode assembly, thus providing an example comparison of sizes of the electrodes stacked in a zigzag fashion. The electrode assembly according to at least one of the embodiments described or recited herein may further include a separate reinforcing tab 70 on the electrode lead connection tabs 14 and 24, placed on one side of the electrode assembly. The reinforcing tab 70 is joined to an electrode lead 60, and thus a tab-lead joint portion 50 having a backing structure for the electrode lead connection tabs 14 and 24 and the electrode lead 60 is formed using the reinforcing tab 70. The reinforced joint method for the electrode lead connection tabs 14 and 24 and the electrode lead 60 using the reinforcing tab 70 is applied to at least any one of a positive electrode tab and a negative electrode tab.

The reinforcing tab 70 reinforces the strength of joint portions between the respective electrode lead connection tabs 14 and 24 and the electrode lead 60, and thus physically reinforces the joint portions. For example, on an upper stage of the electrode lead connection tab extended from the electrode of the electrode assembly, the reinforcing tab 70 formed of a homogeneous or heterogeneous metal and having a thickness one to five times greater than the electrode lead connection tab may be overlapped by welded to on the upper stage of the electrode lead connection tab. The overlapped reinforcing tab 70 and the electrode lead connection tab may have the same thickness or different thicknesses. The overlapped reinforcing tab 70 may have a width of 3 mm to 5 mm and a length of 2 mm to 4 mm. However, this is just an example and the present disclosure is not limited thereto.

Specifically, the electrode lead assembled on the reinforcing tab 70, overlapped by joined to the electrode lead connection tab may have a width of 2 mm to 3 mm and a length of 0.5 mm to 1 mm. However, this is just an example and the present disclosure is not limited thereto. The current collector of the electrode, as described and recited herein, may be any one of a group consisting of aluminum, stainless steel and copper; and the electrode lead may be formed of any one material from among aluminum, nickel and nickel-coated copper. The overlapped reinforcing tab on the tab-lead joint portion for the electrode lead connection tab and the electrode lead may be circular, oval, or polygonal in shape.

Further, the electrode lead joined to any one electrode lead connection tab among the electrode tabs included in the electrode assembly may have a bending tab structure 80 that is bent 180° in a direction opposite toward the outside of the electrode assembly the electrode lead connection tab is welded toward the electrode assembly. Accordingly, it is possible to obtain a joint reinforcing structure between the electrode tab and the electrode lead with a minimized local mechanical load in a flexible environment for the battery. This configuration by which the electrode lead connection tab is joined to the electrode lead 60 by bending may be applied to at least any one of a positive electrode tab and a negative electrode tab. The electrode lead 60 joined on the electrode lead connection tab may have a width of 2 mm to 3 mm and a length of 1 mm to 3 mm. However, this is just an example and the present disclosure is not limited thereto.

Meanwhile, the tab-lead joint portions 50 in which the electrode lead connection tabs 14 and 24 are respectively joined to an electrode lead 60 using the reinforcing tab 70 and the tab-lead joint portion 50 in which the electrode lead connection tab is joined to the electrode lead 60 having the bending tab structure 80 are inserted and aligned, i.e., placed, in the separator. Accordingly, it is possible to protect a flexible battery by suppressing the exposure of a terminal portion to the outside, which is the greatest weakness of the flexible battery.

In FIG. 4, a mixture layer coated on each of electrodes B and B' including both an electrode lead connection tab and an electrode parallel connection tab has a smaller area than a mixture layer coated on an electrode C including only an electrode parallel connection tab.

Also, the mixture layer of the electrode B placed on the outside relative to electrode B' has a larger size than the mixture layer of the electrode B'. Thus, it is possible to reduce the precipitation of lithium around a corner of a negative electrode.

In at least one embodiment described and recited in the present disclosure, the electrode B serves as an outermost electrode, which is a negative electrode, and the electrode B' is a positive electrode facing the outermost electrode with a separator interposed therebetween. That is, in the electrode assembly, the electrode B as a negative electrode is placed on the lowermost stage, the electrode B' as a positive electrode is placed on the electrode B, and the electrode C including only an electrode parallel connection tab is placed as a negative electrode on the electrode B'. Meanwhile, electrodes, each including only an electrode parallel connection tab, may be further placed between the electrode B' and the electrode C.

FIG. 5A to FIG. 5F are exploded views of various electrode assemblies in which a positive electrode or a negative electrode is placed as an outermost electrode, according to embodiments described and recited herein.

Figure 6:
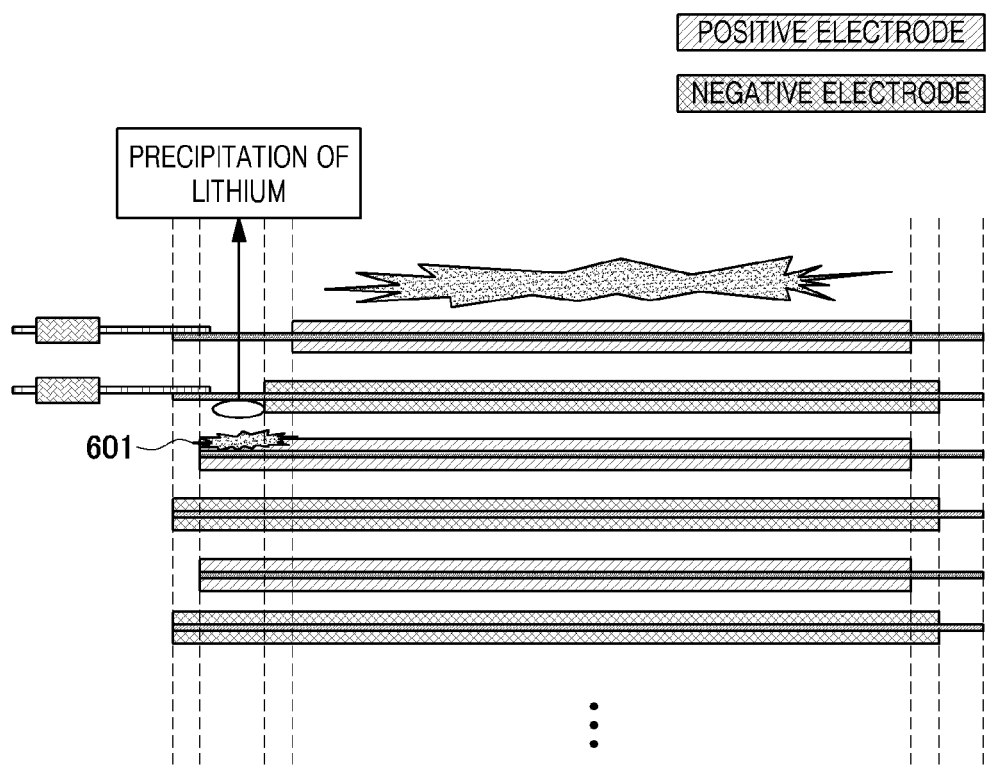
FIG. 6 shows the precipitation of lithium on a negative electrode as a battery is charged or discharged, depending on sizes of a negative electrode mixture and a positive electrode mixture when a positive electrode is placed as an outermost electrode of an electrode assembly, according to at least one embodiment of the present disclosure.

FIG. 6 shows the precipitation of lithium on a negative electrode as a batter is charged or discharged, depending on the sizes of a negative electrode mixture and a positive electrode mixture when a positive electrode is placed as an outermost electrode of an electrode assembly, according to embodiments described and recited herein.

To suppress damage to a tab-lead joint portion, which is most likely to be broken when a flexible battery is bent, the tab-lead joint portion is placed inside an electrode without being exposed to the outside of the battery. To do so, an area of a mixture layer coated on an electrode, including both an electrode parallel connection tab and an electrode lead connection tab, have a smaller size than an area of a mixture layer coated on an electrode including only an electrode parallel connection tab.

Figure 5A:
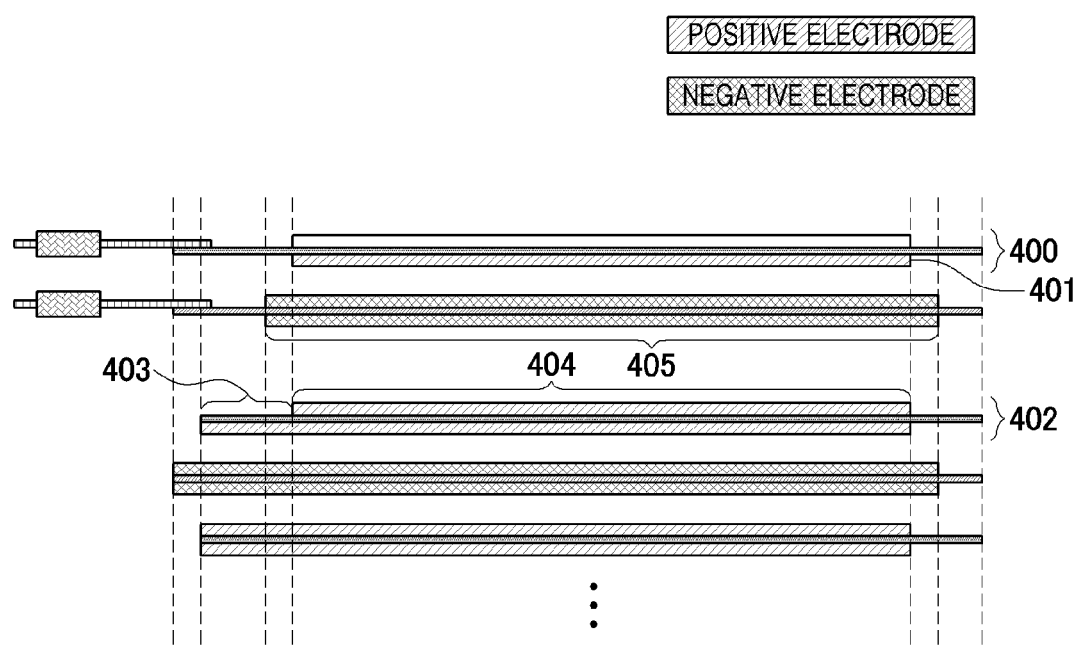
FIG. 5A to FIG. 5F are exploded views of various electrode assemblies in which a positive electrode or an negative electrode is placed as an outermost electrode, according to embodiments of the present disclosure.
Figure 5B:
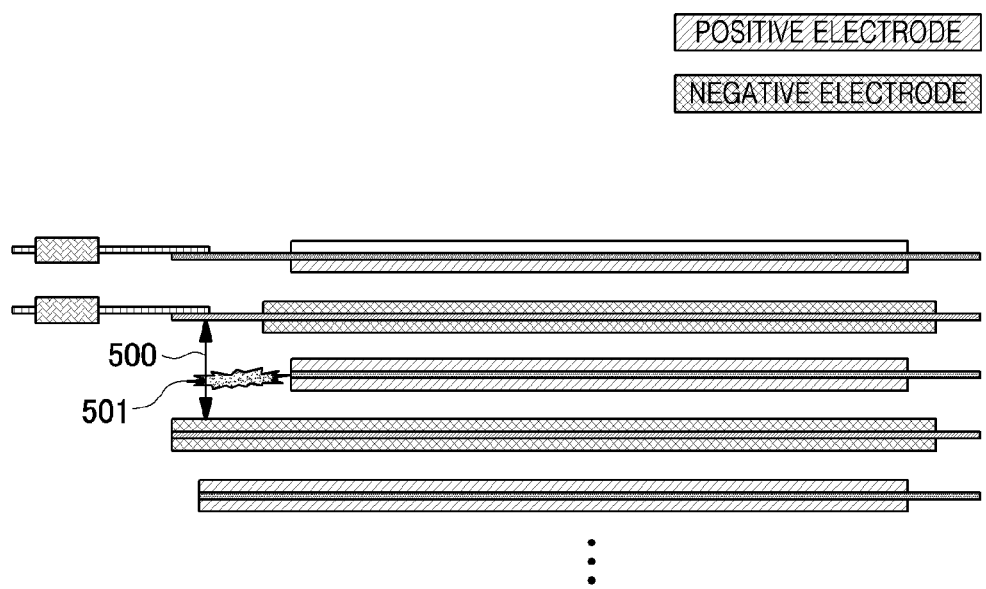

As illustrated in FIG. 5A, FIG. 5B and FIG. 6, when a positive electrode is placed as the outermost electrode, the size of the mixture layer on the positive electrode facing a negative electrode including the electrode lead connection tab needs to be decreased. If not, lithium leaking from the positive electrode during charge may precipitate around a corner of the negative electrode, causing a decrease in capacity and efficiency as well as an increase in resistance; and the precipitated lithium grows in a needle-shape, causing damage to a separator and an internal short circuit within the battery.

Referring to FIG. 5A, when a positive electrode is placed as the outermost electrode 400 of the electrode assembly, a single surface 401 of the outermost positive electrode is to be coated, and a positive electrode placed 402 as a middle layer is to have a region 403 that is not coated with a mixture so that a positive electrode mixture coating layer 404 containing a positive electrode active material faces a negative electrode mixture coating layer 405 containing a negative electrode active material throughout the whole area.

Further, referring to FIG. 5B, according to another embodiment, a single surface of the outermost positive electrode is to be coated; and a negative electrode that includes both an electrode parallel connection tab and an electrode lead connection tab and a positive electrode, which is located between negative electrodes each including only an electrode parallel connection tab and does not include an electrode lead connection tab, is to be smaller in size than another positive electrode including only an electrode parallel connection tab. That is, a partial region 501 in which a positive electrode mixture layer needs to be placed is not used, and, thus, the energy density is decreased. Further, a thickness step 500 in a direction of the thickness of the electrode assembly in which electrodes are stacked may increase around a negative electrode lead-tab joint portion, and, thus, the breakage of the joint portion may cause a degradation in quality of the flexible battery when bent.

Figure 5C:
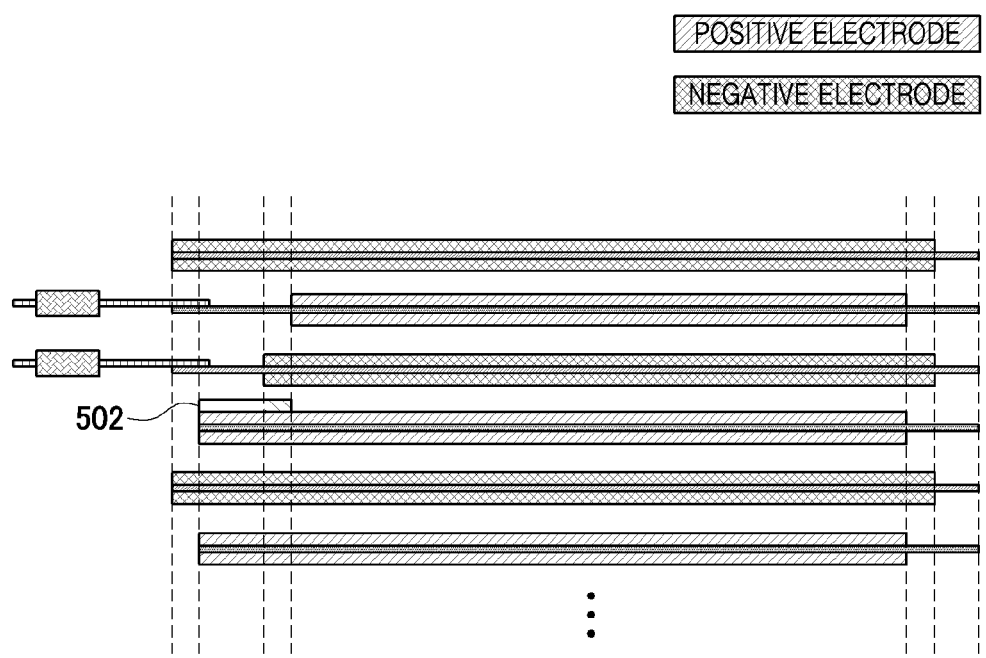

Referring to FIG. 5C, a flexible member 502, such as adhesive tape, adhesive or resin, formed of an acryl- or urethane-based inactive material that does not react with an electrolyte and blocks the flow of ions may be added to a portion 502 where a negative electrode and a positive electrode do not face each other.

However, to perform the above-described methods, various electrodes including an electrode including a parallel connection tab and an electrode, which includes both a parallel connection tab and a lead connection tab as a positive electrode and a negative electrode, is to be manufactured in various sizes. Also, the electrodes are to be designed and managed even if an additional material is to be used for a contact surface between the positive electrode and the negative electrode. Therefore, the workability is very low, which results in an increase in manufacturing costs, and the energy density becomes low.

Figure 5D:
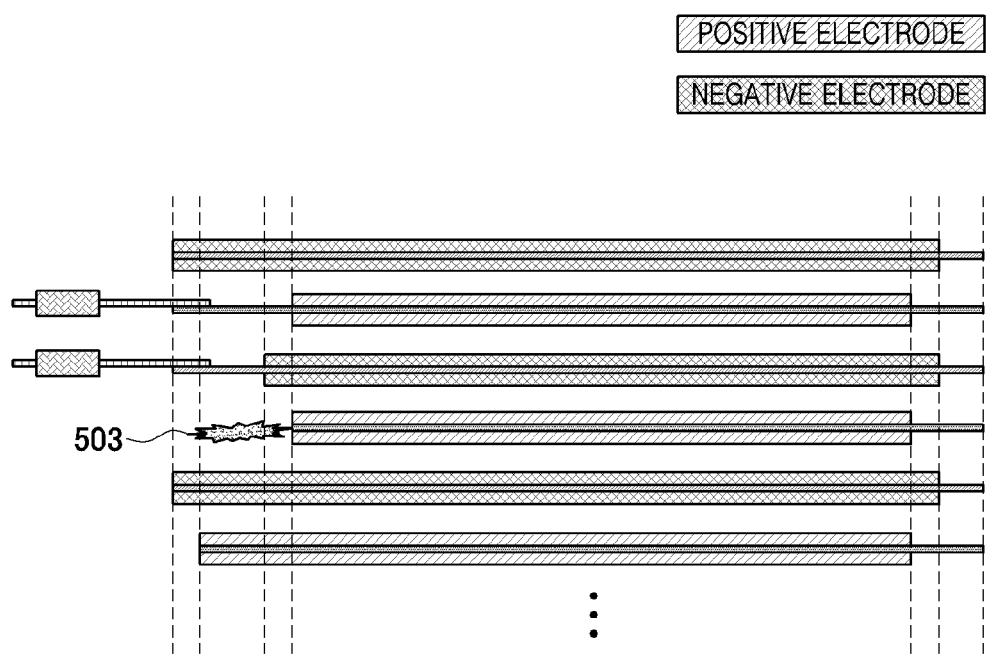
Figure 5E:
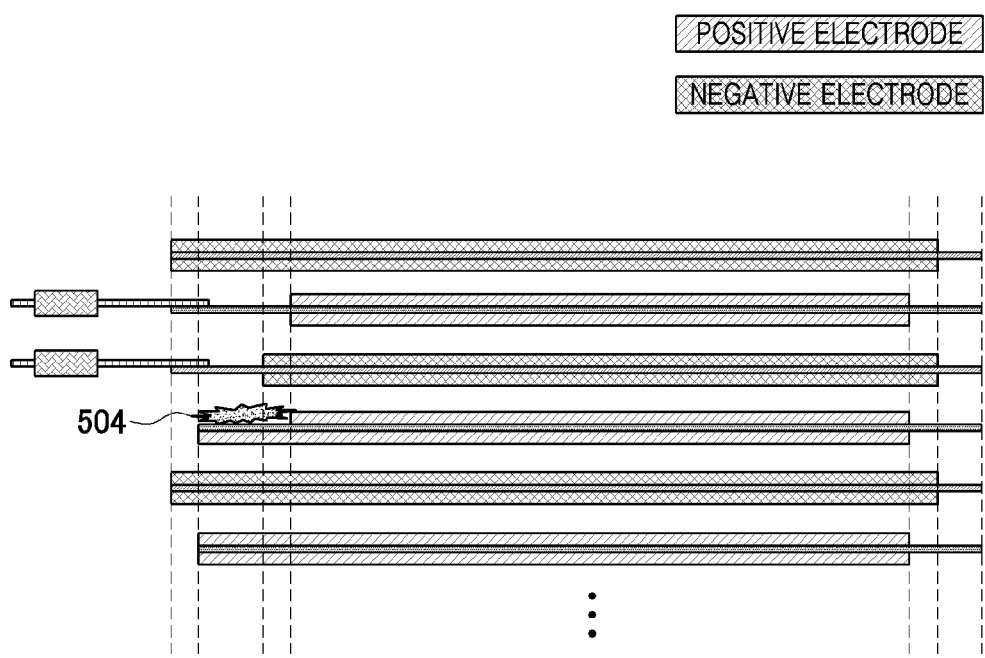

Referring to FIG. 5D and FIG. 5E, when electrodes each including both a lead connection tab and a parallel connection tab are not biased to any one of the outermost sides, even if a negative electrode is placed on the outermost side among the electrodes of the electrode assembly, the positive electrodes that each have only a parallel connection tab are to be different in size from each other to have a step portion 503 as illustrated in FIG. 5D or need to have a portion 504 in which a mixture layer is not coated, and, thus, a positive electrode active material does not react as illustrated in FIG. 5E due to a tab-lead joint portion placed inside the electrode assembly.

However, various electrodes including an electrode that has only a parallel connection tab and an electrode that has both a parallel connection tab and a lead connection tab as a positive electrode and a negative electrode are to be manufactured in various sizes. Also, the electrodes need to be designed and managed even in consideration of a contact surface between the positive electrode and the negative electrode. Therefore, the workability is very low, which results in an increase in manufacturing costs.

Figure 5F:
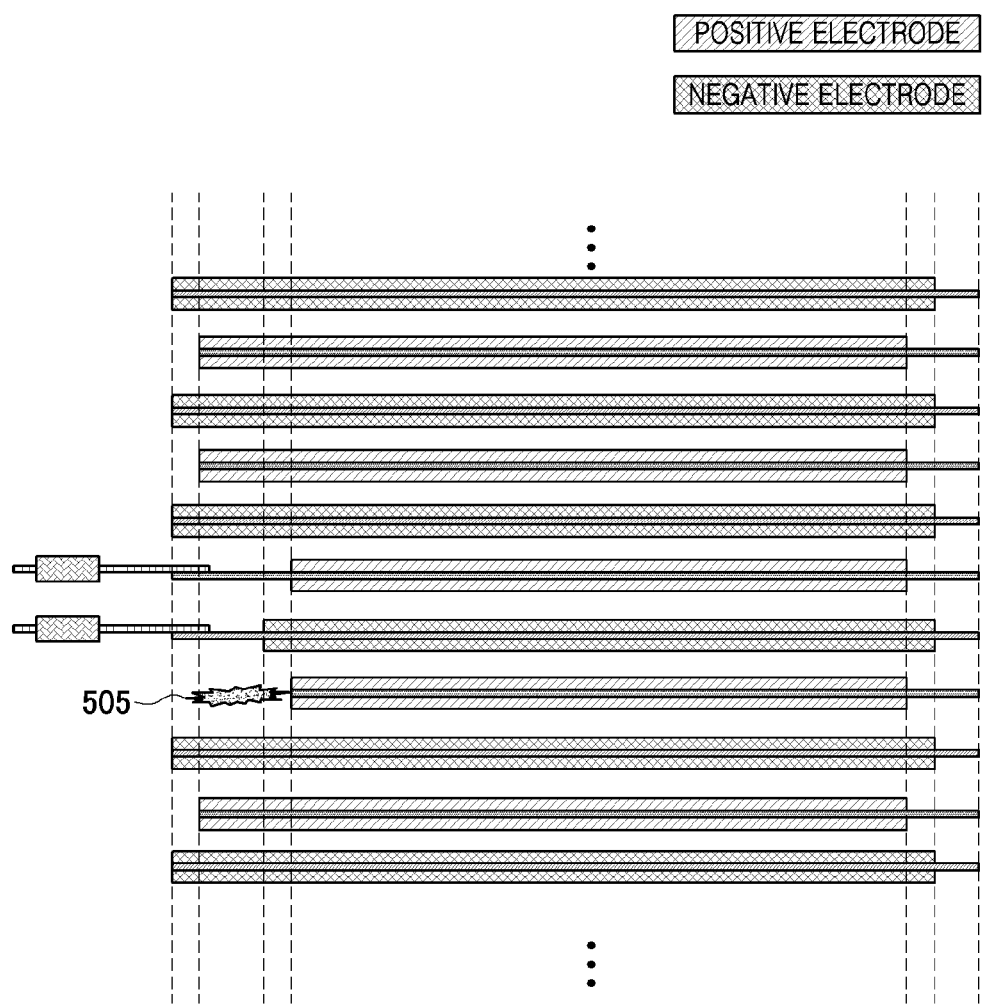

Also, referring to FIG. 5F, if an electrode lead connection tab is placed between the electrodes of the electrode assembly rather than on any one of the outermost sides in a direction of the thickness of the electrodes, the electrodes need to be manufactured in various sizes and managed in order not to form dendrites when the battery charges.

Further, if an electrode lead is placed in a middle portion of the electrode assembly, the durability of the battery decreases when bent or twisted, due to a thickness step (e.g., 505) of inner electrodes. Therefore, if the step portion 505 is not compensated for by filling a flexible inactive material in the step portion 505, a portion with low mechanical strength and low flexibility may be cracked and cut. Thus, the performance is likely degraded or the battery may not be charged or even used.

That is, in view of the foregoing, it is desirable to design an electrode lead and an electrode including a lead connection tab to be biased to the outermost side among the electrodes of the electrode assembly.

Further, referring to FIG. 6, if a positive electrode is placed as an outermost electrode of the electrode assembly and an inner positive electrode does not face an inner negative electrode, i.e., a positive electrode mixture layer is longer than a negative electrode mixture layer (601), the performance may be degraded due to the precipitation of lithium at a specific portion and a safety problem may occur due to dendrites. If both surfaces of the outermost electrode of the electrode assembly are coated with a positive electrode mixture, lithium ions from an outer positive electrode mixture layer move to and react with a negative electrode, which causes a safety problem.

Figure 7:
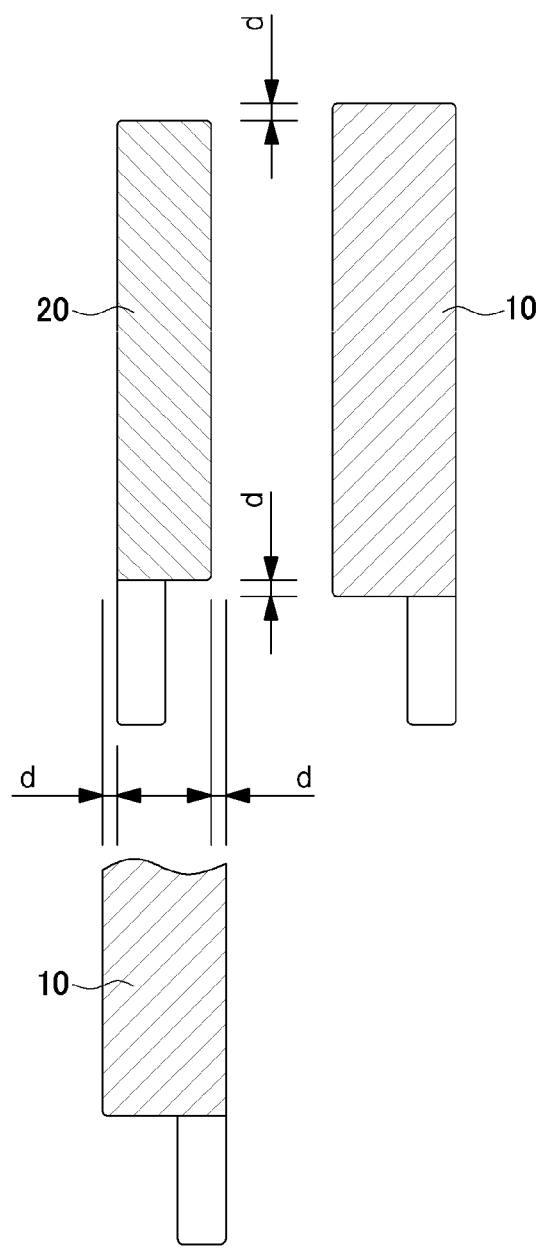
FIG. 7 shows non-limiting examples of relative sizes of a negative electrode mixture and a positive electrode mixture coated on a pair of electrodes having different polarities and only an electrode parallel connection tab, according to at least one embodiment of the present disclosure.
Figure 8:
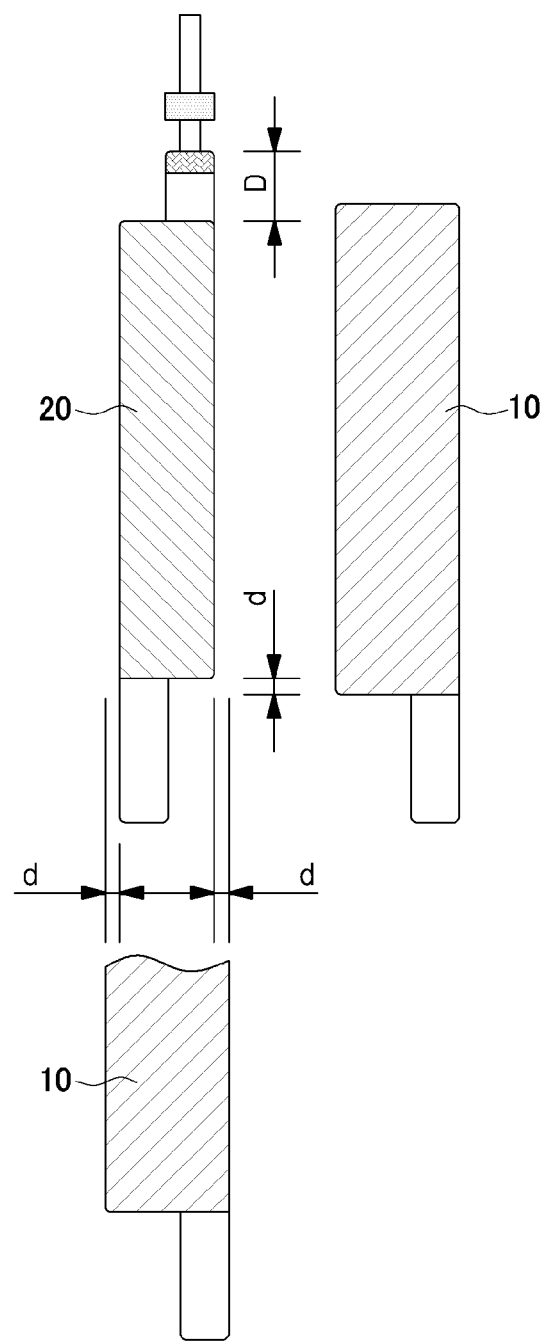
FIG. 8 shows non-limiting examples of relative sizes of an negative electrode mixture and a positive electrode mixture on a negative electrode including only an electrode parallel connection tab and a positive electrode and both an electrode parallel connection tab and an electrode leas connection tab, respectively, according to at least one embodiment of the present disclosure.

FIG. 7 and FIG. 8 illustrate the methods of designing the suitable areas for the electrode mixture layers to solve the above-described problems.

If the size of the positive electrode mixture layer that contributes to the capacity of the battery is decreased to suppress the above-described phenomenon, the energy density also decreases accordingly, which is not desirable.

Meanwhile, when a positive electrode mixture layer is coated on both surfaces, the sizes of coating need to be different, which cause a deterioration in process capability during manufacturing. Therefore, according to the present disclosure, it is desirable to place a negative electrode as an outermost electrode of the electrode assembly.

FIG. 7 illustrates that the size of a negative electrode mixture coated on a negative electrode among a pair of electrodes having different polarities, each including only an electrode parallel connection tab, is set to be larger than the size of a positive electrode mixture coated on a positive electrode. A corner of the negative electrode mixture is designed to be deviated to the outside by a difference d of less than 5 mm with respect to a corner of the positive electrode mixture. Here, an negative electrode capacity per unit area is 1 to 1.2 times greater than a positive electrode capacity per unit area.

FIG. 8 illustrates that, when a negative electrode that includes only an electrode parallel connection tab and a positive electrode that includes both an electrode parallel connection tab and an electrode lead connection tab face each other with a separator interposed therebetween, the size of a negative electrode mixture coated on the negative electrode that includes only an electrode parallel connection tab is set to be greater than the size of the positive electrode that includes both an electrode parallel connection tab and an electrode lead connection tab. A corner of the negative electrode mixture is designed to be deviated to the outside by a difference d of less than 5 mm with respect to a corner of the positive electrode mixture. Further, a connection portion between the electrode tab and the electrode terminal, i.e., the tab-lead joint portion 50 formed on the positive electrode, which is the physically weakest portion in the flexible battery is placed inside the electrode assembly. Thus, it is possible to suppress cracks or cutting at the weak portion. To this end, the negative electrode including only an electrode parallel connection tab may be designed to be greater by a length D of an electrode tab formed on the edge of the positive electrode including the tab-lead joint portion 50 and not coated with the positive electrode mixture. In other words, desirably, the negative electrode that includes only an electrode parallel connection tab covers the positive electrode that includes both an electrode parallel connection tab and an electrode lead connection tab. With this configuration, the bending durability of an electrode tab-terminal joint portion of the flexible battery can be improved.

Figure 9:
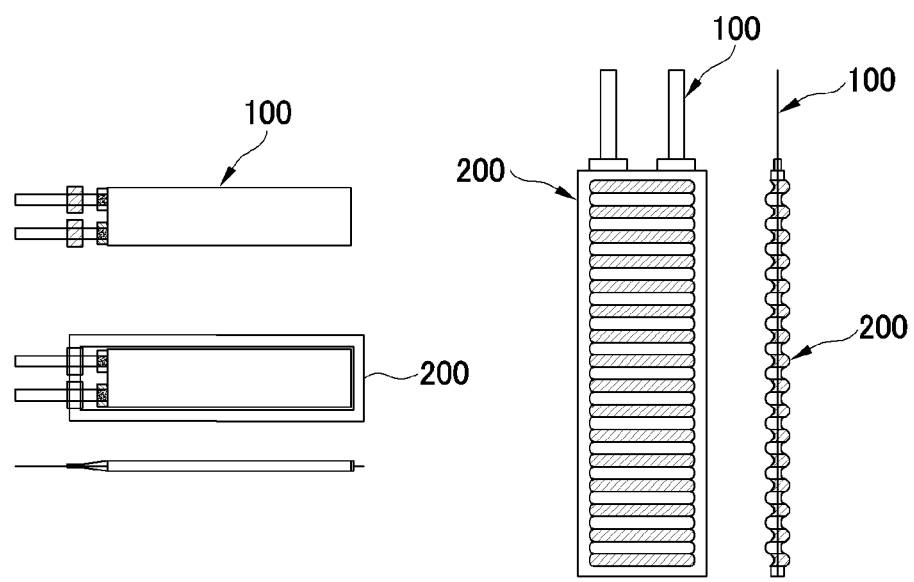
FIG. 9 illustrates a flexible battery including an electrode assembly and a case covering the electrode assembly, according to at least one embodiment of the present disclosure.

Referring to FIG. 9, a case 200 having a structure in which upper stamped portions and lower stamped portions are repeatedly stamped is placed to cover the outside of the electrode assembly according to the present disclosure.

Figure 10:
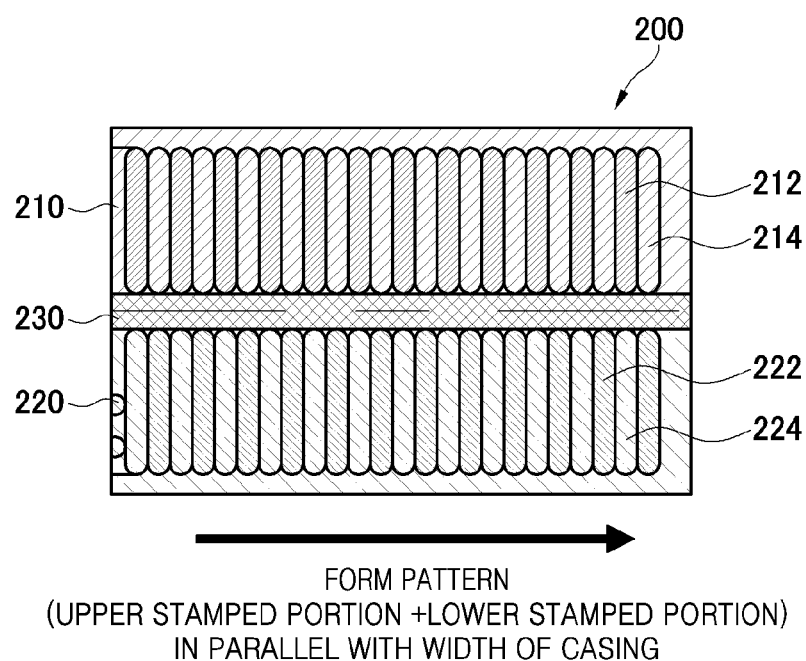
FIG. 10 illustrates a pattern of upper stamped portions and lower stamped portions formed in parallel with a width of a case included in a flexible battery, according to at least one embodiment of the present disclosure.

Referring to FIG. 10, the multiple upper stamped portions and lower stamped portions repeatedly stamped on the case have a repeated pattern and shape and thus may compress and provide support for the flexible battery that includes the electrode assembly when bent, twisted, or contorted.

The multiple upper stamped portions and lower stamped portions are successively formed in parallel with the width of the electrode assembly and the case.

The multiple upper stamped portions and lower stamped portions are stamped by an upper mold and a lower mold, respectively.

The case covering the outside of the electrode assembly may include an upper case 210 and a lower case 220 on the electrode assembly based on a line in a sealing portion 230. That is, multiple upper stamped portions 212 and 222 and multiple lower stamped portions 214 and 224 repeatedly formed on the case are symmetric based on the sealing portion and symmetrically stamped on the upper case 210 and the lower case 220. In this state, the sealing portion is bent in a vertically symmetric manner and then, the electrode assembly is housed inside the case.

The sealing portion, serving as the basis of division between the upper case 210 and the lower case 220, may have a width of 3 mm to 5 mm, and a substantive sealing may have a width of 1 mm to 2 mm. However, this is just an example and the present disclosure is not limited thereto.

Figure 11:
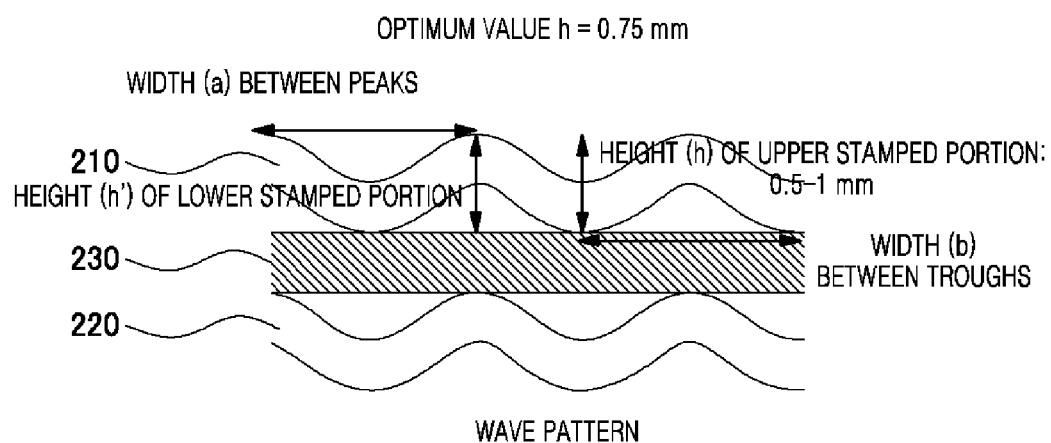
FIG. 11 illustrates examples of shapes of upper stamped portions and lower stamped portions formed in a case, according to at least one embodiment of the present disclosure.

Referring to FIG. 11, a height h of the multiple upper stamped portions repeated on the case may be identical to a height h' of the multiple lower stamped portions repeated on the case (h=h').

The heights h and h' of the multiple upper stamped portions and lower stamped portions repeated on the case may be in the range of 0.5 mm to 1 mm and have an optimum value of 0.75 mm. However, this is just an example and the present disclosure is not limited thereto.

Further, a width a between peaks of the multiple upper stamped portions adjacent to each other on the case may be identical to a width b between troughs of the multiple lower stamped portions (a=b), and, thus, a wave pattern is formed.

In the present disclosure, a negative electrode may be placed as an outermost electrode in an electrode assembly including multiple electrodes stacked in a vertical direction with a separator interposed therebetween to suppress the breakage of an electrode terminal during bending of a flexible battery.

Figure 12:
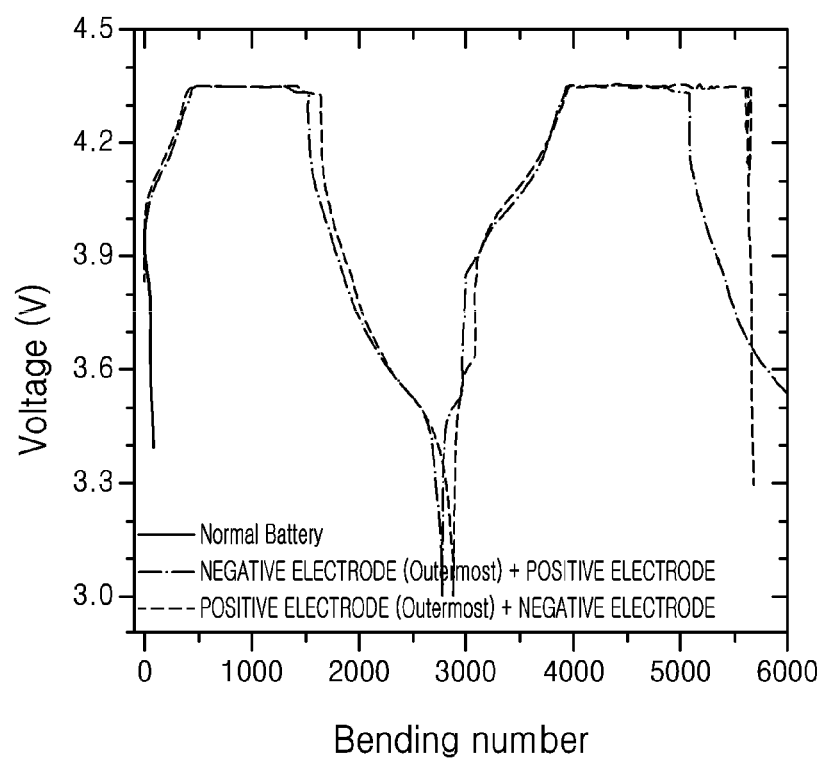
FIG. 12 is a graph showing bending cycles as a battery is charged or discharged when a negative electrode is placed as an outermost electrode of an electrode assembly, for when a positive electrode is placed as an outermost electrode and in battery, according to at least one embodiment of the present disclosure.

FIG. 12 is a graph showing changes in voltage depending on the number of bending cycles during charge/discharge in a case where a negative electrode is placed as an outermost electrode, in a case where a positive electrode is placed as an outermost electrode and in a normal battery that does not include an electrode parallel connection tab and an electrode lead connection tab separately according to an embodiment of the present disclosure. This is the result of monitoring voltages in real time during charge/discharge while repeated bending is performed under test conditions with the radius of curvature of 25 mm and a bending speed of 20 times per minute.

FIG. 12 shows the result of bending tests on a battery in which a negative electrode is used as an outermost electrode and a battery in which a positive electrode is used as an outermost electrode. In the above-described normal battery, an electrode lead-tab joint portion was broken before bending 30 times. In the battery in which a positive electrode is used as an outermost electrode, a voltage noise was generated after bending approximately 3,800 times and then, the voltage sharply dropped during charge. Meanwhile, in the battery in which a negative electrode is used as an outermost electrode according to the present disclosure, a terminal portion of an electrode was not damaged and a normal electrochemical operation was performed even after bending 6,000 times.

That is, in an electrode assembly according to the present disclosure, positive electrodes and negative electrodes having different polarities with a separator interposed therebetween are sequentially stacked and a negative electrode is placed as an outermost electrode on each of the uppermost stage and the lowermost stage. Thus, it is possible to improve the workability and minimize the loss of energy density and also possible to enhance the bending durability and the safety.

Figure 13A:
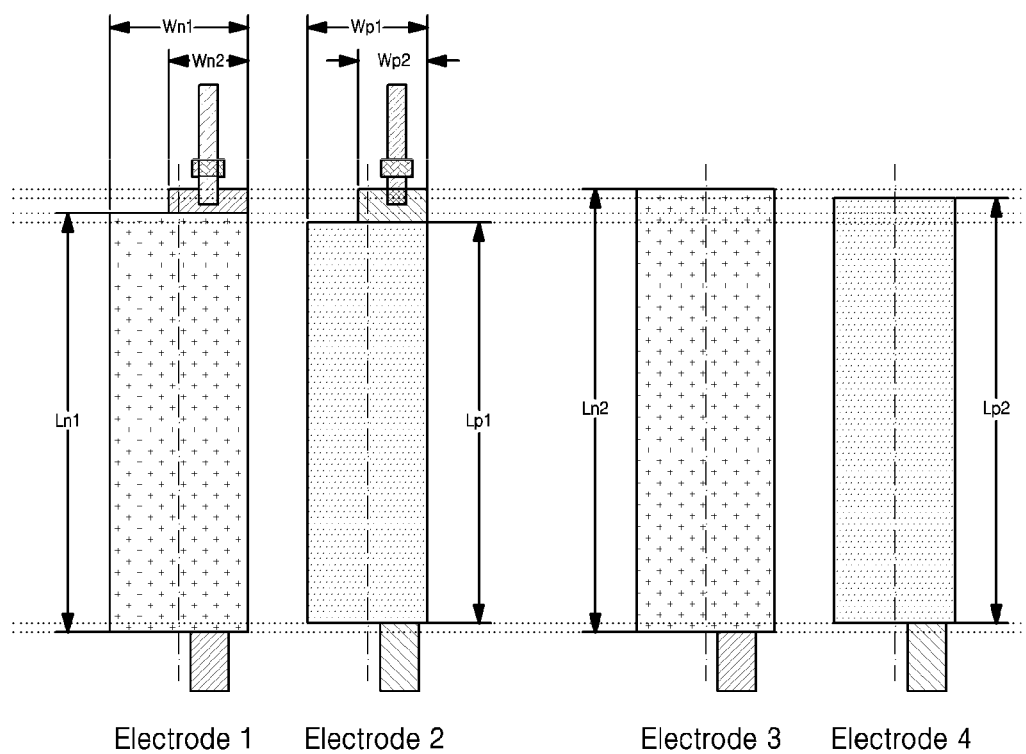
FIG. 13A to FIG. 13C show comparative widths of electrodes and lead connection tabs, according to embodiments of the present disclosure.
Figure 13B:
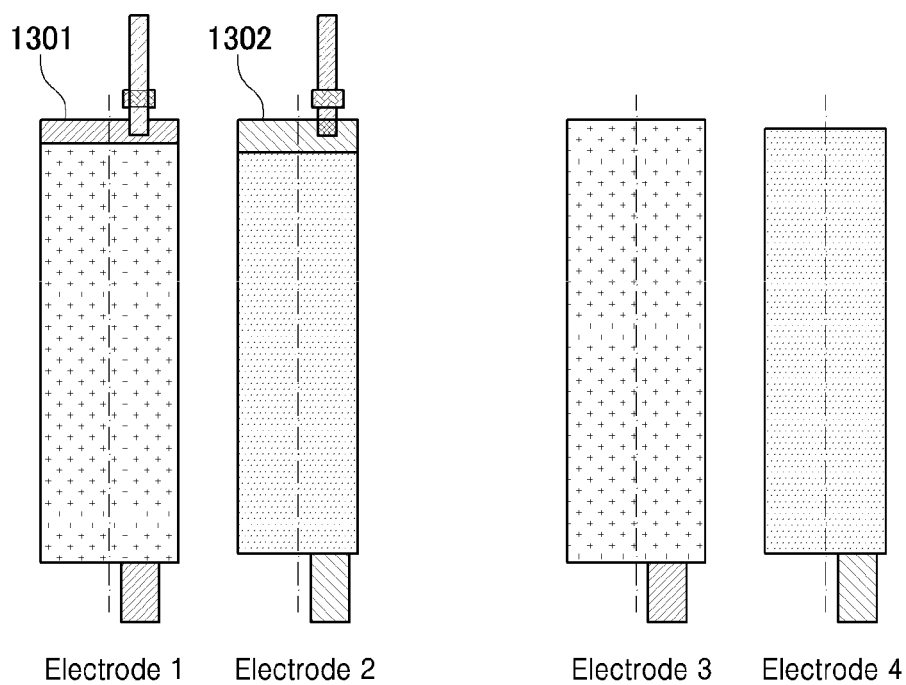
Figure 13C:
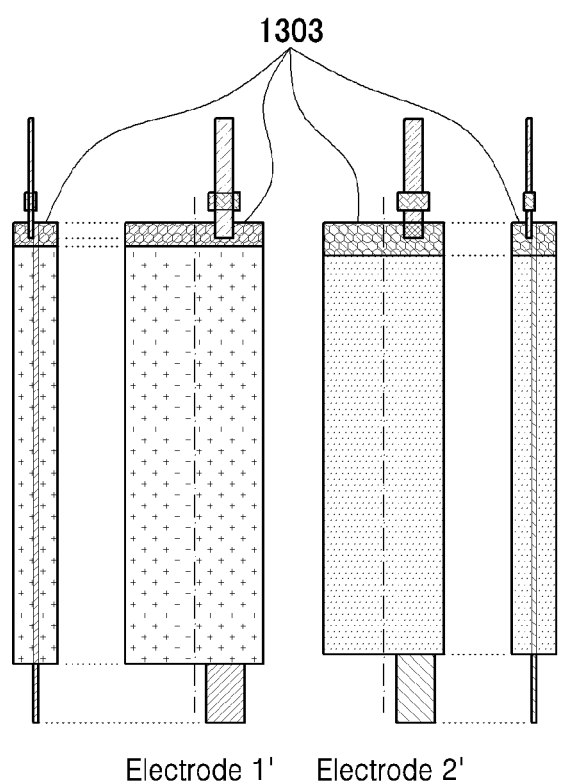

FIG. 13A to FIG. 13C are diagrams provided to explain embodiments depending on the width of an electrode and the width of a lead connection tab according to the present disclosure.

Referring to FIG. 13A, the electrode width of a first electrode Electrode 1 and the width of a lead connection tab are Wn1 and Wn2, respectively, and the electrode width of a second electrode Electrode 2 and the width of a lead connection tab are Wp1 and Wp2, respectively.

In FIG. 13A, Wn2 is equal to or greater than half Wn1, and Wp2 is equal to or greater than half Wp1. According to the present embodiment, if the electrodes adjacent to each other have the same electrode width Wn1 and Wp1, the widths Wn2 and Wp2 of the lead connection tabs of the respective electrodes adjacent to each other are designed to be equal to or greater than half the electrode widths Wn1 and Wp1, and, thus, the electrodes may be placed to overlap each other in part.

As for conventional flexible batteries, a tab-lead joint portion where an electrode tab and an electrode lead are joined to each other is formed outside a separator of an electrode assembly and exposed to the outside. Therefore, in a flexible environment such as bending, the durability is degraded, and, thus, the electrode may be separated or the electrode tab not coated with a mixture may be damaged and cut in many cases.

To solve this problem, in the present disclosure, a tab-lead joint portion where an electrode tab and an electrode lead are joined to each other is placed inside a separator of an electrode assembly. However, even in this case, an external force may be repeatedly applied, and the electrode tab may be damaged and cut inside the separator. This is caused by the deformation of a material formed along a step portion during bending due to a thickness step formed among the electrode tab, the tab-lead joint portion and electrodes stacked in different sizes inside the separator. Therefore, the present disclosure suggests a method for manufacturing a flexible battery below to minimize the thickness step within the electrode assembly and thus solve the above-described problem.

If electrode tabs of respective electrodes having different polarities and connected with a positive electrode lead and a negative electrode lead, respectively, are placed outside a separator so as to be located on the same line in the same direction, when the electrode tabs of the respective electrodes having different polarities are electrically connected with each other, an internal short circuit occurs, which may cause a safety problem. That is, to suppress the occurrence of this problem, the electrode tabs of the respective electrodes having different polarities are separated in the opposite directions or spaced apart from each other so as not to overlap each other. The widths of the electrode tabs of the respective electrodes are determined depending on a positional relationship between the electrode tabs of the respective electrodes.

However, in the present disclosure, the electrode tab is located inside the separator of the electrode assembly and the tab-lead joint portion where the electrode tab and the electrode lead are joined to each other can be formed inside the separator. Therefore, the electrode tabs of the respective electrodes having different polarities may be insulated by the separator. That is, in the present disclosure, the degree of freedom in designing the widths of electrode tabs formed on respective electrodes can be improved. For example, if the electrode widths of the electrodes having different polarities are Wn1 and Wp1, respectively, as illustrated in FIG. 13A, the widths Wn2 and Wp2 of the respective lead connection tabs may be designed to be equal to or greater than half (red line) the electrode widths Wn1 and Wp1, respectively. That is, even if the widths Wn2 and Wp2 of the lead connection tabs of the respective electrodes are seen as visually/physically overlapping each other in part, the lead connection tab and the tab-lead joint portion of each electrode may be separated and electrically insulated by the separator. Therefore, in the present disclosure, the widths Wn2 and Wp2 of the lead connection tabs of the respective electrodes are designed to be equal to or greater than half the electrode widths Wn1 and Wp1, respectively, and, thus, it is possible to suppress cracks and a short circuit at the electrode tab-lead joint portion caused by the thickness step within the electrode assembly.

For another example, in FIG. 13B, the width (e.g., Wn2) of a lead connection tab is identical to the electrode width (e.g., Wn1). Referring to FIG. 13B, a width 1301 of the lead connection tab of the first electrode and a width 1302 of the lead connection tab of the second electrode may be identical to the electrode widths of the respective electrodes. In this case, the tab-lead joint portion and the electrode tab can be placed inside the separator as in the embodiment illustrated in FIG. 13A. Thus, it is possible to resolve a concern about a short circuit between the electrodes.

FIG. 13C is a diagram provided to explain a method for reducing a thickness step caused by a non-coating of a mixture on an electrode tab-lead joint portion according to an embodiment of the present disclosure.

Referring to FIG. 13C, to minimize a thickness step caused by a non-coating of a mixture on an electrode tab-lead joint portion, a flexible material (e.g., acryl- and urethane-based resin and a film, tape or adhesive formed by mixing them) that does not react with a positive electrode and an electrolyte may be inserted into or attached to an electrode tab region 1303 connected with an electrode lead. The flexible material used herein may have flexibility equal to or higher than that of each electrode mixture layer included in an electrode assembly.

Figure 14:
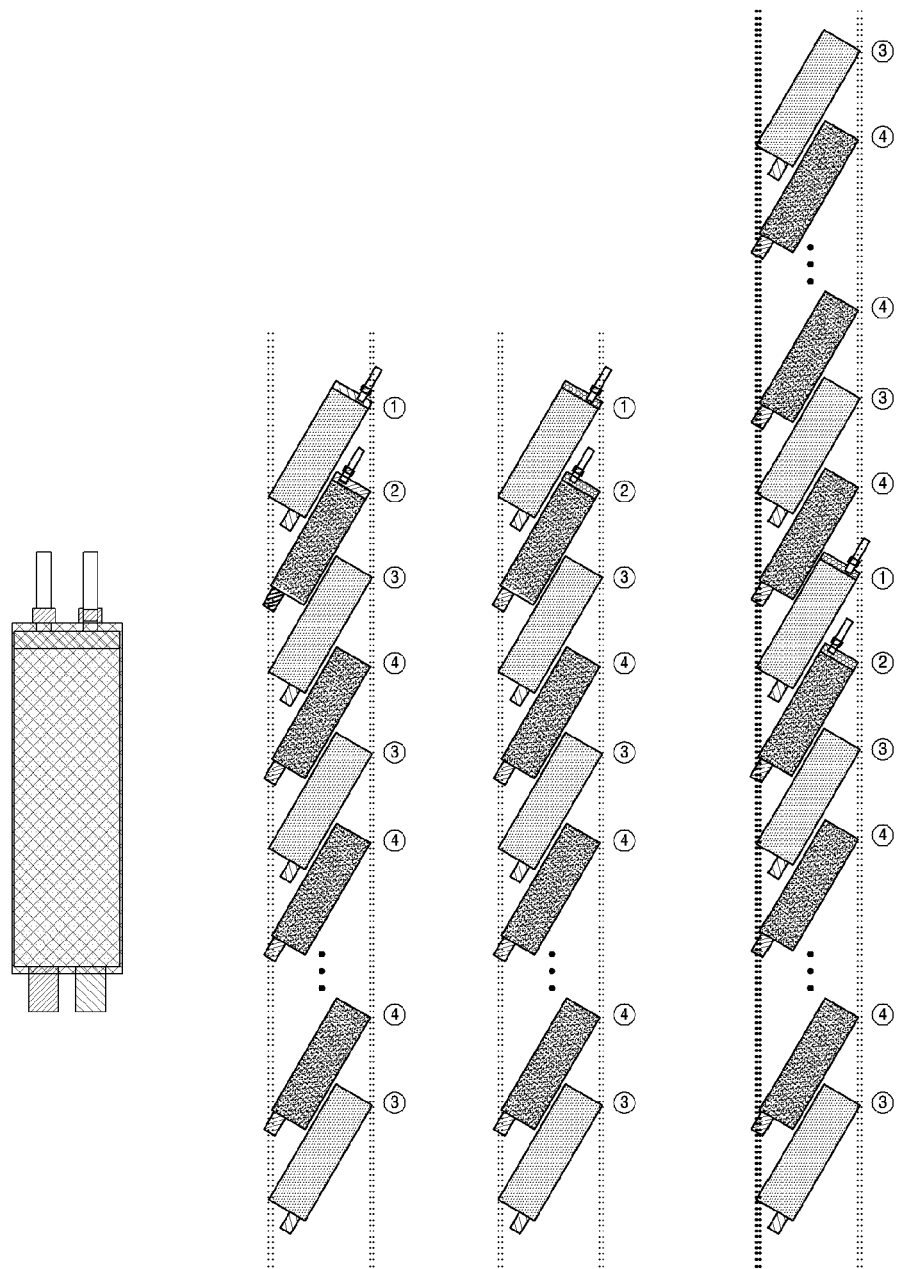
FIG. 14 illustrates the improved battery flexibility provided by stacking electrodes, according to at least one embodiment of the present disclosure.

FIG. 14 is a diagram provided to explain a method for improving the flexibility of a battery by stacking numerous electrodes according to an embodiment of the present disclosure. Referring to FIG. 14, it is possible to manufacture flexible batteries having various electrode stack structure and various number of stacks by using the present disclosure and improve the flexibility of a battery. Here, a tab-lead joint portion formed by connecting an electrode lead and an electrode tab is located inside a separator of an electrode assembly. Further, according to the present disclosure, a thickness step formed at an electrode tab-lead joint portion of each electrode can be effectively reduced, and, thus, in a use environment requiring the bendability of a battery, the battery with the improved flexibility can be stably driven. Also, the battery can be safely protected against a danger such as an internal short circuit. Further, as described above in the present disclosure, the width of an electrode lead connection tab joined to an electrode lead can be designed to be greater than that of a conventional flexible battery. Therefore, a stable current flow passage can be secured, and, thus, an increase in internal resistance of the battery can be minimized. Also, heat generation caused by resistance can be minimized, and, thus, the safety can be secured.

Figure 15:
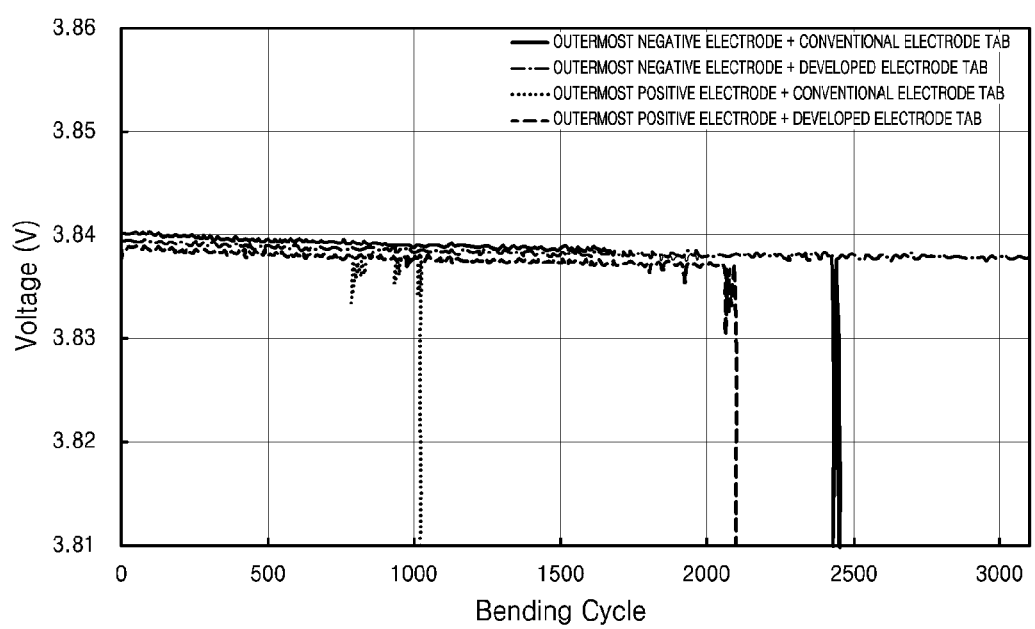
FIG. 15 is a graph showing results of at least one bending test on batteries that include an electrode assembly manufactured by placing a positive electrode or a negative electrode as an outermost electrode and a different width for each electrode lead connection tab, according to at least one embodiment of the present disclosure.

FIG. 15 is a graph showing the result of bending tests on batteries each including an electrode assembly manufactured by placing a positive electrode or a negative electrode as an outermost electrode and setting a different width for each electrode lead connection tab according to an embodiment of the present disclosure.

Herein, test samples include a total of four samples (a negative electrode as an outermost electrode with a conventional electrode tab, a negative electrode as an outermost electrode with a developed electrode tab, a positive electrode as an outermost electrode with a conventional electrode tab and a positive electrode as an outermost electrode with a developed electrode tab). The developed electrode tab refers to an electrode tab which is located inside a separator of an electrode assembly as described above and in which lead connection tab regions between electrodes having different polarities and facing each other with the separator interposed therebetween overlap each other based on a projection region.

Referring to FIG. 15, a repeated bending test was performed using each sample at a 50% state of charge and voltages thereof were monitored.

This is the result of monitoring voltages in real time while repeated bending is performed under test conditions with the radius of curvature of 20 mm and a bending speed of 25 times per minute. According to this result, in the battery in which a positive electrode is used as an outermost electrode of an electrode assembly, a voltage noise was generated and an electrode lead connection tab was cut and the voltage sharply dropped before repeated bending 2,000 times. However, the battery in which a negative electrode is used as an outermost electrode of an electrode assembly exhibited a better durability than the battery in which a positive electrode is used as an outermost electrode, and the battery including a developed electrode tab exhibited a higher durability than the battery including a conventional electrode tab. Therefore, it can be seen that the flexible battery including a negative electrode as an outermost electrode of an electrode assembly and a developed electrode tab is excellent in durability against an external force such as repeated bending compared with a conventional flexible battery.

We claim:

1. An electrode assembly, comprising:
a plurality of electrodes; and
one or more unit cells, each of the one or more unit cells including at least a pair of electrodes of the plurality of electrodes having different polarities with a separator interposed therebetween,
wherein at least one of an electrode parallel connection tab and an electrode lead connection tab is formed on each electrode of the plurality of electrodes, and
wherein a negative electrode of the pair of electrodes is an outermost electrode and includes first electrode parallel connection tab and a first electrode lead connection tab provided at a side opposite to the first electrode parallel connection tab and inside of the separator, and
wherein an area of a mixture layer of a positive electrode of the pair of electrodes including a second electrode parallel connection tab and a second electrode lead connection tab provided at a side opposite of the second electrode parallel connection tab and inside of the separator among the plurality of electrodes included in the electrode assembly is smaller than an area of a mixture layer of the negative electrode corresponding to the outermost electrode,
wherein the mixture layer of the negative electrode corresponding to the outermost electrode is provided between the first electrode parallel connection tab and the first electrode lead connection tab, and
wherein the mixture layer of the positive electrode is provided between the second electrode parallel connection tab and the second electrode lead connection tab.

2. The electrode assembly of claim 1, wherein, in another pair of electrodes having different polarities of the plurality of electrodes that include only the electrode parallel connection tab, a size of a negative electrode mixture coated on a negative electrode of the another pair of electrodes is greater than a size of a positive electrode mixture coated on a positive electrode of the another pair of electrodes,
a corner of the negative electrode mixture deviates to an outside of the electrode assembly by less than 5 mm with respect to a corner of the positive electrode mixture, and
a negative electrode capacity per unit area is 1 to 1.2 times greater than a positive electrode capacity per unit area.

3. The electrode assembly of claim 1, wherein,
in another pair of electrodes that includes a negative electrode that includes only the electrode parallel connection tab and a positive electrode that includes both the electrode parallel connection tab and the electrode lead connection tab and face each other with a separator interposed therebetween, a size of a negative electrode mixture coated on the negative electrode that includes the electrode parallel connection tab is greater than a size of the positive electrode including both the electrode parallel connection tab and the electrode lead connection tab, a corner of the negative electrode including only the electrode parallel connection tab deviates to an outside of the electrode assembly by less than 5 mm with respect to a corner of the positive electrode mixture, and the negative electrode including only the electrode parallel connection tab covers a tab-lead joint portion formed on the positive electrode.

4. The electrode assembly of claim 1, wherein the outermost negative electrode of the plurality of electrodes is placed on each of an uppermost stage and a lowermost stage among the plurality of electrodes of the electrode assembly and one surface of the outermost negative electrode is coated with an electrode mixture.

5. The electrode assembly of claim 1, further comprising:
a reinforcing tab formed on any one electrode lead connection tab among electrode tabs included in the electrode assembly.

6. The electrode assembly of claim 1, wherein an electrode lead joined on any one electrode lead connection tab among electrode tabs included in the electrode assembly further includes a bending structure.

7. The electrode assembly of claim 5, wherein a tab-lead joint portion having a structure in which the electrode lead connection tab and an electrode lead are overlapped using the reinforcing tab is located inside the separator.

8. The electrode assembly of claim 6, wherein a tab-lead joint portion where the electrode lead connection tab and the electrode lead having the bending structure are joined to each other is located inside the separator.

9. The electrode assembly of claim 1, further comprising:
a case covering the electrode assembly, and
wherein the case has upper stamped portions and lower stamped portions that are repeatedly stamped to cover the outside of the electrode assembly.

10. The electrode assembly of claim 9, wherein the multiple upper stamped portions and lower stamped portions are formed in parallel with the width of the electrode assembly and the case.

11. The electrode assembly of claim 1, wherein the electrode assembly is formed by stacking three or more electrodes of the plurality of electrodes having different sizes.

12. The lithium ion secondary battery of claim 11, wherein among the electrodes included in the electrode assembly, a positive electrode including the electrode parallel connection tab and the lead connection tab has the smallest size.

* * * * *